United States Patent
Goswami et al.

(10) Patent No.: US 6,822,579 B2
(45) Date of Patent: Nov. 23, 2004

(54) STEERABLE TRANSCEIVER UNIT FOR DOWNHOLE DATA ACQUISTION IN A FORMATION

(75) Inventors: Jaideva C. Goswami, Houston, TX (US); Albert E. Hoefel, Sugar Land, TX (US); Jacques R. Tabanou, Houston, TX (US); Bradley S. Underwood, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 689 days.

(21) Appl. No.: 09/899,243

(22) Filed: Jul. 3, 2001

(65) Prior Publication Data

US 2002/0167418 A1 Nov. 14, 2002

Related U.S. Application Data

(60) Provisional application No. 60/289,667, filed on May 9, 2001.

(51) Int. Cl.$^7$ .............................................. G01W 3/00
(52) U.S. Cl. .............................. 340/854.6; 340/853.2; 342/368; 342/354; 455/272; 455/101; 455/562.1
(58) Field of Search ........................... 340/853.1, 853.2, 340/854.6; 375/220; 342/373, 368, 354; 455/562.1, 272, 101, 502.1

(56) References Cited

U.S. PATENT DOCUMENTS

| | | |
|---|---|---|
| 4,057,781 A | 11/1977 | Scherbatskoy |
| 4,780,678 A | 10/1988 | Kleinberg et al. |
| 4,806,928 A | 2/1989 | Veneruso |
| 5,045,795 A | 9/1991 | Gianzero et al. |
| 5,442,294 A | 8/1995 | Rorden |
| 5,463,319 A | 10/1995 | Chesnutt et al. |
| 5,530,359 A | 6/1996 | Habashy et al. |
| 5,563,512 A | 10/1996 | Mumby |
| 5,829,520 A | 11/1998 | Johnson |
| 6,028,534 A * | 2/2000 | Ciglenec et al. ......... 340/856.2 |
| 6,070,662 A | 6/2000 | Ciglenec et al. |
| 6,100,696 A | 8/2000 | Sinclair |
| 6,163,155 A | 12/2000 | Bittar |
| 6,234,257 B1 * | 5/2001 | Ciglenec et al. ............. 175/50 |
| 6,535,165 B2 * | 3/2003 | Stephens ................... 342/375 |
| 6,539,621 B1 * | 4/2003 | Taylor et al. ................ 29/828 |
| 6,600,776 B1 * | 7/2003 | Alamouti et al. .......... 375/147 |
| 6,661,375 B2 * | 12/2003 | Rickett et al. ............. 342/372 |
| 6,671,499 B1 * | 12/2003 | Ylitalo et al. .............. 455/101 |
| 6,697,642 B1 * | 2/2004 | Thomas .................. 455/562.1 |
| 6,710,742 B1 * | 3/2004 | Meredith ................... 342/373 |
| 6,728,554 B1 * | 4/2004 | Wegner ................... 455/562.1 |
| 6,762,718 B2 * | 7/2004 | Chang et al. .............. 342/373 |
| 6,763,062 B1 * | 7/2004 | Kohno et al. .............. 375/220 |

FOREIGN PATENT DOCUMENTS

| | | |
|---|---|---|
| EP | 0 572 309 | 12/1993 |
| WO | WO 95/24663 | 9/1995 |

* cited by examiner

Primary Examiner—Albert K. Wong
(74) Attorney, Agent, or Firm—Jennie (JL) Salazar; Brigitte L. Echols; John J. Ryberg

(57) ABSTRACT

A method and apparatus for collecting data downhole in a well bore, even during drilling operations, are disclosed. The apparatus generally comprises an antenna and some associated electronic circuitry. The antenna includes a plurality of arrayed transceiver elements and the electronic circuitry steers transmission or reception through the antenna by controlling the application of power to the array elements. In operation, a transceiver unit containing such an antenna is positioned proximate a remote sensor placed into a formation. An electromagnetic signal is then steered to communicate with the remote sensor over a wireless link.

62 Claims, 9 Drawing Sheets

STEERABLE TRANSCEIVER UNIT FOR DOWNHOLE DATA ACQUISTION IN A FORMATION

This application claims priority of provisional U.S. application No. 60/289,667 filed May 9, 2001.

BACKGROUND OF THE INVENTION

1. Field of the Invention

This invention relates generally to the drilling of wells, such as for the production of petroleum products, and, more particularly, the acquisition of subsurface formation data such as formation pressure, formation permeability and the like.

2. Description of the Related Art

In oil well description services, one part of the standard formation evaluation characteristics is concerned with the reservoir pressure and the permeability of the reservoir rock. Present day operations obtain these characteristics either through wireline logging via a "formation tester" tool or through drill stem tests. Both types of measurements are available in "open-hole" or "cased-hole" applications, and require a supplemental "trip". A trip typically involves removing the drill string from the well bore, running a formation tester into the well bore to acquire the formation data, and, after retrieving the formation tester, running the drill string back into the well bore for further drilling. Because "tripping the well" uses significant amounts of expensive rig time, it is typically done under circumstances where the formation data is absolutely needed, during a drill bit change, or when the drill string is being removed for some other drilling related reason.

On the other hand, during well drilling activities, the availability of reservoir formation data on a "real time" basis is a valuable asset. Real time formation pressure obtained while drilling will allow a drilling engineer or driller to make decisions concerning changes in drilling mud weight and composition as well as penetration characteristics at a much earlier time to thus promote the selected aspects of drilling. The availability of real time reservoir formation data is also desirable to enable precision control of drill bit weight in relation to formation pressure changes and changes in permeability so that the drilling operation can be carried out with greater efficiency.

It is therefore desirable to acquire various formation data from a subsurface zone of interest while the drill string is present within the well bore. This eliminates or minimizes the need for tripping the well solely to run formation testers into the well bore to identify formation characteristics such as pressure, temperature, permeability, etc. One such technique is disclosed in U.S. Pat. No. 6,028,534, issued to Schlumberger Technology Corporation on Feb. 22, 2000, as assignee of the named inventors Ciglenec, et al. This patent is commonly assigned herewith. In this technique, a remote sensor containing sensor instrumentation and associated electronics is deployed into a formation. The remote sensor also contains an antenna and a battery to communicate with a host antenna on the drill collar while the drill string is in the well bore. Once deployed, the remote sensor measures one or more of the formation's characteristics. After the measurement is complete, the data is stored in the remote sensor. A wireless communication channel is subsequently established between the remote sensor and the drill collar for data transfer.

The data transfer will typically occur, at least some of the time, during drilling operations. The drill string in which the drill collar is installed will both rotate and translate during drilling operations. However, the remote sensor, by virtue of its deployment into the formation, will neither translate nor rotate in any significant sense. Thus, during the data transfer, there may be rotational as well as translational movement of the collar antenna with respect to the remote antenna. Consequently, there frequently are two main aspects in regards to electromagnetic coupling between the collar antenna and the remote antenna—locating the remote sensor, and maintaining the communication channel for the entire data transfer once the remote sensor has been found.

The present invention is directed to resolving, or at least reducing, one or all of the problems mentioned above.

SUMMARY OF THE INVENTION

The invention includes a method and apparatus for collecting data downhole in a well bore, even during drilling operations. The apparatus generally comprises an antenna and some associated electronic circuitry. The antenna includes a plurality of arrayed transceiver elements and the electronic circuitry steers transmission or reception through the antenna by controlling the application of power to the array elements. In operation, a transceiver unit containing such an antenna is positioned proximate a remote sensor placed into a formation. An electromagnetic signal is then steered to communicate with the remote sensor over a wireless link.

BRIEF DESCRIPTION OF THE DRAWINGS

The invention may be understood by reference to the following description taken in conjunction with the accompanying drawings, in which like reference numerals identify like elements, and in which.

Figure 1:
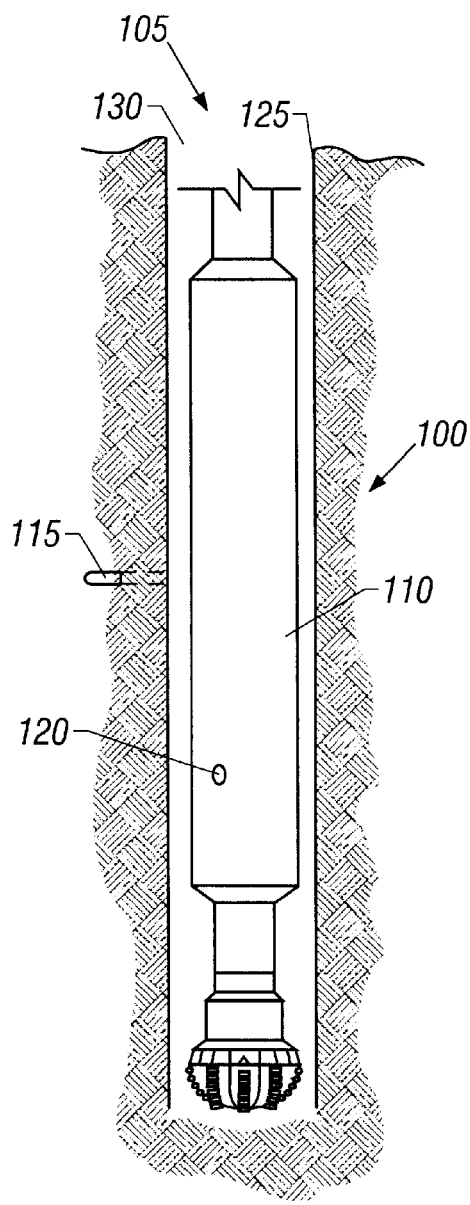
FIG. 1 is a diagram of a drill collar positioned in a borehole and equipped with a steerable transceiver unit in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2:
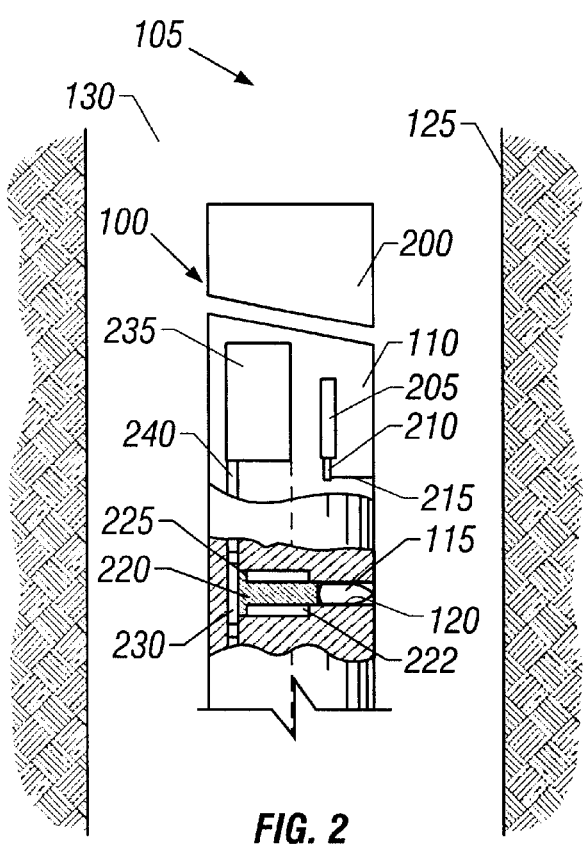
FIG. 2 is a schematic illustration of the steerable transceiver unit of the drill collar of FIG. 1 showing a hydraulically energized system for emplacing a remote sensor from the borehole into a selected subsurface formation.

FIG. 1 depicts one particular embodiment of a drill collar 100. The drill collar 100 comprises but one component of a drill string (not otherwise shown) for drilling a well bore 105. The drill collar 100 is provided with a sonde section 110 including a power cartridge 200, shown in FIG. 2, incorporating the transmitter/receiver circuitry 300 of FIG. 3. As shown in FIG. 2, the drill collar 100 includes a pressure gauge 205 whose pressure sensor 210 is exposed to borehole pressure in the well bore 105 via a drill collar passage 215. The pressure gauge 205 senses ambient pressure at the depth of a selected subsurface formation and is used to verify pressure calibration of remote sensors. Electronic signals (not shown) representing ambient well bore pressure are transmitted via the pressure gauge 205 to the circuitry of the power cartridge 200. The power cartridge 200 then performs a pressure calibration of a remote sensor 115, shown best in FIG. 1, being deployed at that particular well bore depth.

The drill collar 100 is also provided with one or more remote sensor receptacles 120, also shown in FIG. 1. Each sensor receptacle 120 contains a remote sensor 115 for positioning within a selected subsurface formation of interest intersected by the well bore 105. As will be discussed further below, the remote sensor 115 is positioned, in this particular embodiment, while the well bore 105 is being drilled. Note, however, that the remote sensor 115 may be previously emplaced and used in conjunction with the steerable transceiver unit of the present invention. In such embodiments, efforts will typically need to be made to identify the location of the remote sensor 115, as is discussed more fully below.

The remote sensors 115 are encapsulated "intelligent" sensors that are moved from the drill collar 100 to a position within the formation surrounding the well bore 105. The remote sensors 115 sense formation characteristics such as pressure, temperature, rock permeability, porosity, conductivity, and dielectric constant, among others. The remote sensors 115 are appropriately encapsulated in a sensor housing of sufficient structural integrity to withstand damage during movement from the drill collar 100 into laterally embedded relation with the subsurface formation surrounding the well bore 105.

FIG. 1 illustrates a single remote sensor 115 embedded in a formation in a roughly perpendicular orientation relative to the well bore 105 and, hence, the drill collar 100. Those skilled in the art having the benefit of this disclosure will appreciate that such lateral embedding movement need not be perpendicular to the well bore 105, but may be accomplished through numerous angles of attack into the desired formation position. Sensor deployment can be achieved utilizing one or more of the following: (1) drilling into the borehole wall 125 and placing the remote sensor 115 into the formation; (2) punching/pressing the encapsulated remote sensors 115 into the formation with a hydraulic press or other mechanical penetration assembly; or (3) shooting the remote sensors 115 into the formation by utilizing propellant charges. Any of these techniques are suitable, depending on the implementation. For instance, although the illustrated embodiment uses a hydraulic mechanism (discussed more fully below), an alternative embodiment emplaces the remote sensor 115 ballistically.

FIG. 2 illustrates a hydraulically energized ram 220 employed for this purpose in the illustrated embodiment. The ram 220 deploys the remote sensor 115 and causes its penetration into the subsurface formation to a sufficient position outwardly from the borehole 130 of the well bore 105 so that it can sense selected characteristics of the formation. For sensor deployment, the drill collar 100 is provided with an internal cylindrical bore 222 within which is positioned a piston element 225 having the ram 220 disposed in driving relation with the encapsulated remote intelligent sensor 115. The piston element 225 is exposed to hydraulic pressure communicated to a piston chamber 230 from a hydraulic system 235 via a hydraulic supply passage 240. The hydraulic system 235 is selectively activated by the power cartridge 200 so that the remote sensor 115 can be calibrated with respect to ambient borehole pressure at formation depth, as described above. The remote sensor 115 can then be moved from the receptacle 120 into the formation beyond the borehole wall 125 so that formation pressure characteristics will be free from borehole effects.

Figure 3:
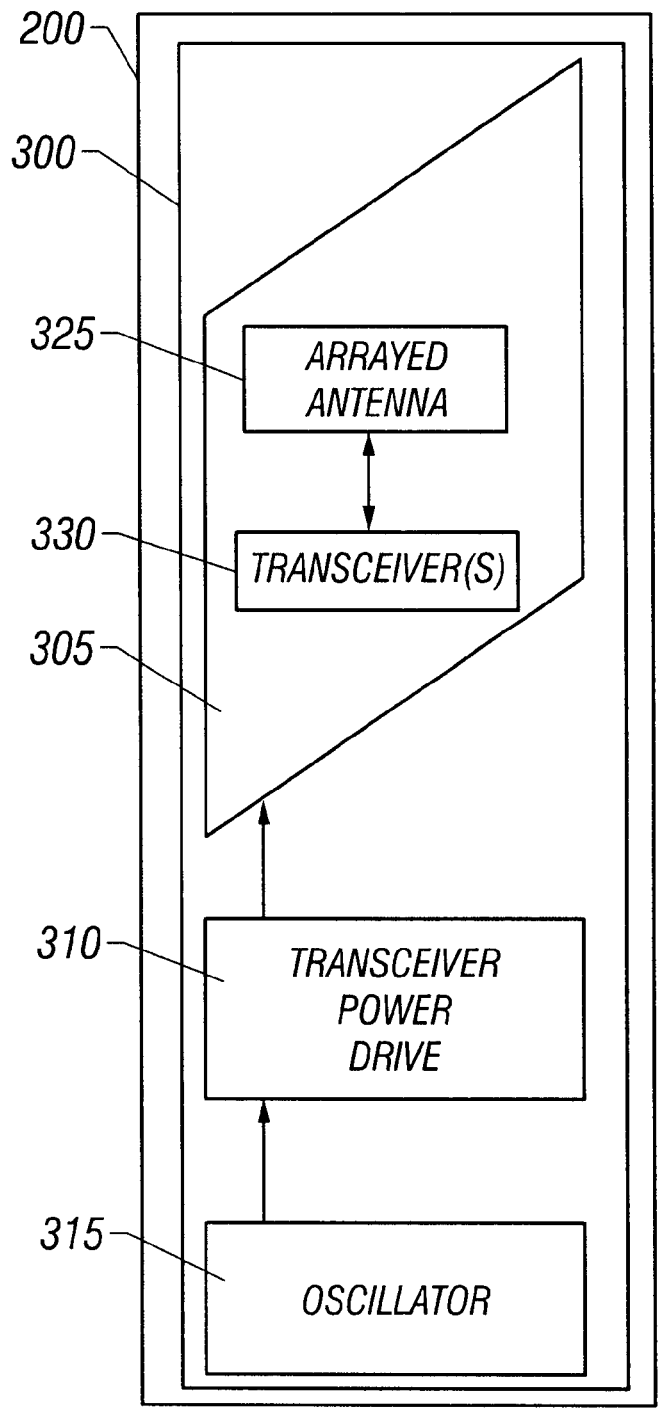
FIG. 3 schematically diagrams the electronic circuitry of the steerable transceiver unit of the drill collar of FIG. 1 for receiving data signals from and transmitting signals to the remote sensor.

Referring now to FIG. 3, the power cartridge 200 of the drill collar 100 includes a transceiver unit 305 driven by a transceiver power drive 310 (e.g., a power amplifier) at a frequency determined by an oscillator 315. The transceiver unit 305 will receive signals that will be transmitted to the sonde section 110 of the drill collar 100 by the remote sensor 115 as will be explained hereinbelow. Note that the 2:1 ratio is not necessary to the practice of the invention, and that other ratios may be employed. The transceiver unit 305 includes an arrayed antenna 325 and one or more transceivers 330, depending on the implementation, which are also discussed more fully below.

Figure 4A:
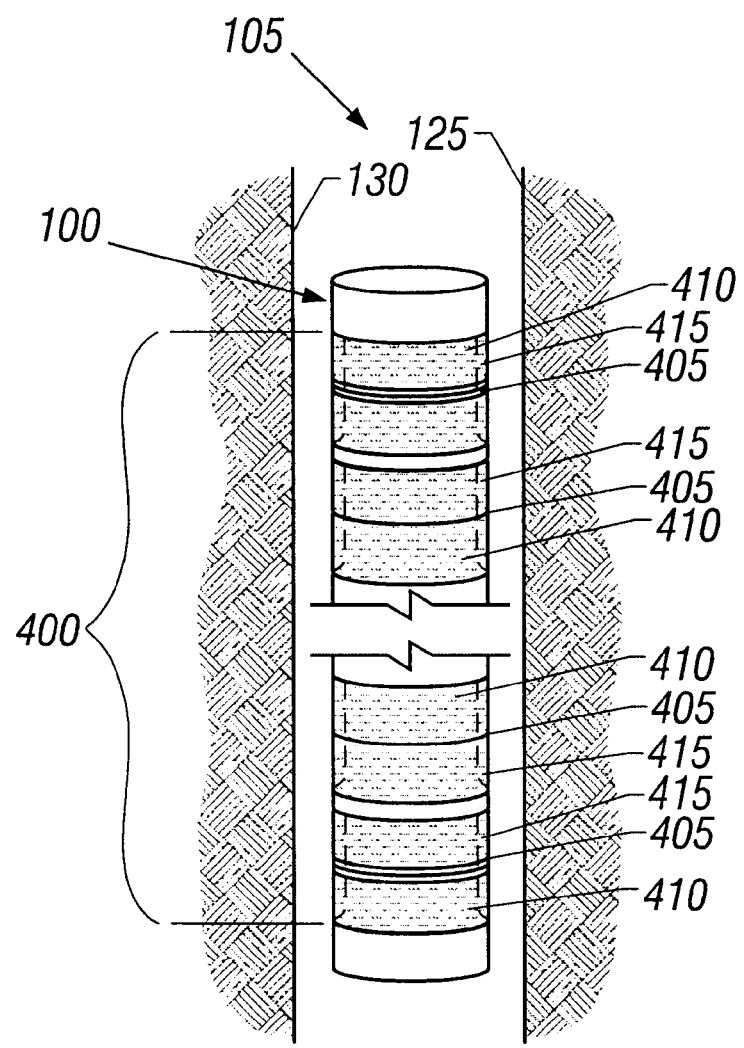
FIG. 4A, FIG. 4B, FIG. 4C, and FIG. 4D illustrate alternative implementations of the arrayed antenna of the steerable transceiver unit of FIG. 3.
Figure 4B:
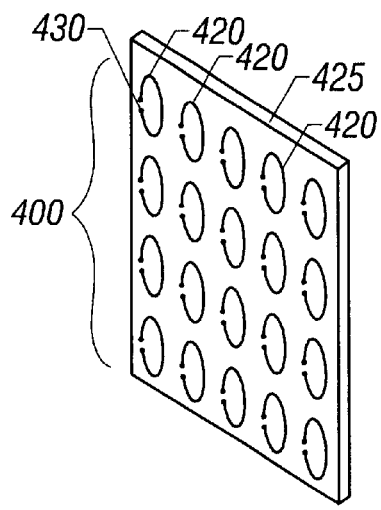
Figure 4C:
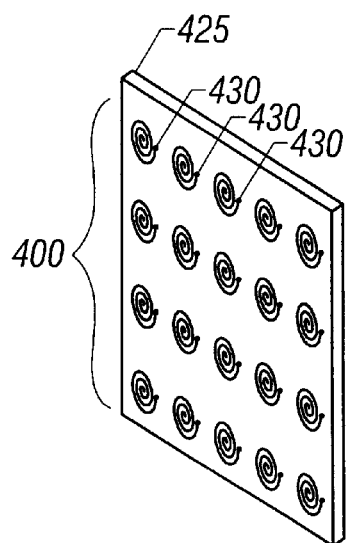
Figure 4D:
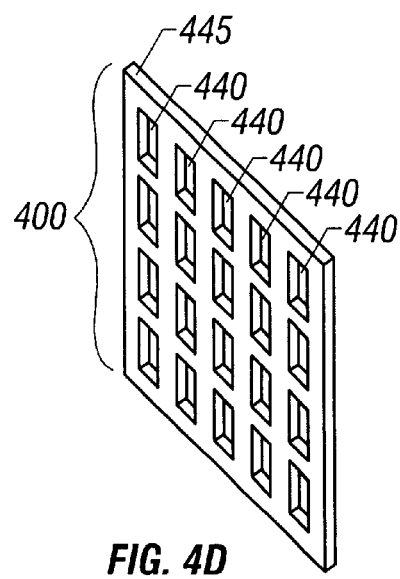

FIG. 4A, FIG. 4B, FIG. 4C, and FIG. 4D illustrate different implementations of the arrayed antenna 325 of the power cartridge 200. Each of these implementations employs multiple transceiver elements 400. In the implementation of FIG. 4A, each transceiver element 400 comprises a coil 405 wound upon a ferrite core 410 in a groove 415 in the ferrite core 410. FIG. 4B illustrates an implementation wherein multiple coils 420 are arrayed upon a flexible insulating board 425 that can be wrapped around the interior of the drill collar 100. Power is supplied to each coil 420 by a respective feed terminal 430. The coils 420 may be of any shape known to the art. The embodiment of FIG. 4C is much the same as the embodiment of FIG. 4B, except that the circular coils 420 are replaced byspiral coils 435. Note that the coils 420, 435 may be replaced by coils of virtually any shape or type in alternative embodiments. FIG. 4D illustrates an implementation wherein multiple slot antennae 440 are arrayed in a metal sheet 445. The metal sheet 445 may be conformal to the drill collar 100. Note that each of these implementations may be generically referred to as arrayed transceiver elements including (i.e., the coils 405, the coils 420, the coils 435, and the slot antennae 440, respectively) since they can all be used in both transmitting and receiving signals. Note also that various aspects of the embodiments in FIG. 4A, FIG. 4B, FIG. 4C, and FIG. 4D may be combined in some embodiments, such as that shown in FIG. 5B and discussed below.

The array elements 400 may be configured in series, in parallel, or in a combination of in series and in parallel, depending on the implementation. This configuration can be hardwired or controlled by the transceiver power drive 310, as discussed further below in connection with FIG. 5A, FIG. 5B. The implementations of the transmitter/receiver elements illustrated in FIG. 4A, FIG. 4B, FIG. 4C, and FIG. 4D are highly scalable in the axial direction. However, certain difficulties arise in exciting an axially long antenna including several coils or slots. In particular, the power requirement can become a limiting factor. This difficulty can be overcome by exciting only a subset of coils or slots at a given time in applications requiring large axial coverage. This design constraint can be realized in a manner discussed more fully below in connection with FIG. 5A, FIG. 5B.

Note that the configuration of the array antenna 325 affects the generation and propagation of the electromagnetic field. Consider the embodiment of FIG. 4A, which will produce an axisymmetric electromagnetic field. Assuming that each coil has the same amount of current (this is not necessary to the practice of the invention, but is being considered only to explain the method), the objective is to find the direction $p_k$ of current in each coil and the corresponding location $d_k$ that maximize the functional, $J(p,d)$, which is a measure of homogeneity and amplitude of magnetic field $$J(p, d) = C_1 \int_v |B_0(r, z)|^2 dv + C_2 \left( C_3 - \int_v \left( \frac{\partial |B_0(r, z)|}{\partial z} \right)^2 dv \right), \quad (1)$$

$$p := \{p_0, p_1, \ldots, p_N\}; p_k \in \{-1, 1\}$$

$$d := \{d_0, d_1, \ldots, d_N\}; d_k \in \Re,$$

where the first term on the right-hand side of Eq. (1) maximizes the mean value of the field and the second term inside the bracket ensures uniformity along the axial direction. From Eq. (1) it is clear that while the distance (d) between coils 405 is a continuous variable, the direction of current (p) flowing through them can assume only two values—positive or negative.

As a result, conventional optimization techniques are either ineffective or inefficient. One particular implementation uses a genetic algorithm employing a random search method and works with discreet variables for optimization. Commercially available genetic algorithms, such as the GEATbx genetic and evolutionary algorithm toolbox for use with MATLAB™, are suitable. Positive constants $C_1$ and $C_2$ are selected to give appropriate weight to each term. Since the genetic algorithm maximizes the objective function, a sufficiently large positive constant $C_3$ is chosen to make the term in the bracket a positive quantity. These constants are empirically selected, primarily based on the requirements of electronic circuits and the signal to noise ratio. For instance, there is a lower limit on the signal level that can be detected by the receiver. Furthermore, there is also a limit on the ability of an electronic circuit to withstand the fluctuation in signal level when the tool moves. These criteria give an idea of the constants that can be used in the formulation. Generally speaking, the values for these constants should range between about 1 and 10, inclusive. In Eq. (1) the number of the coils 405, configured in series in the illustrated embodiment, is represented by N. The space v represents the region over which the spatial variation of the field is optimized.

During the optimization process, for each parameter set (p, d), the magnetic field is computed at every point in the space v. This involves first generating a base field for a single coil 405 and then using superposition to compute the total field for the entire arrayed antenna 325. Although superposition may not hold exactly, it is a reasonable assumption for low-frequency applications if the space v is not too close to the drill collar 100. The total field computation by superposition greatly reduces the computation time. Once an "optimal" set (p, d) is obtained, a finite element method ("FEM") analysis of the whole arrayed antenna 325 is performed. The embodiment illustrated in FIG. 4A achieves a uniform field whose magnitude depends largely on the availability of power, which is quite restricted for the environment in which well-logging tools usually operate. Note that a well-logging tool often operates at a typical depth of about 5 kilometers and has to withstand high temperature (around 175° C.) and high pressure (typically 20,000 psi) environment.

Consider now the embodiment of FIG. 4B, the objective function in Eq. (1) is modified to $$J(p,d) = C_3 - \int |B_0(r,z) - \tilde{B}_0(r,z)|^2 dv, \quad (2)$$

where $\tilde{B}_0(r,z)$ is the desired spatial variation of the field. These fields may be normalized for ease in computation. As mentioned before, the spatial variation of the electromagnetic field may be required to change during the data transfer process to keep bullet and collar antenna in constant communication. As a result there will be several sets of $\tilde{B}_0(r,z)$ and hence, (p,d), the direction of current and position of a coil. These can be computed and stored for real-time application.

Figure 5A:
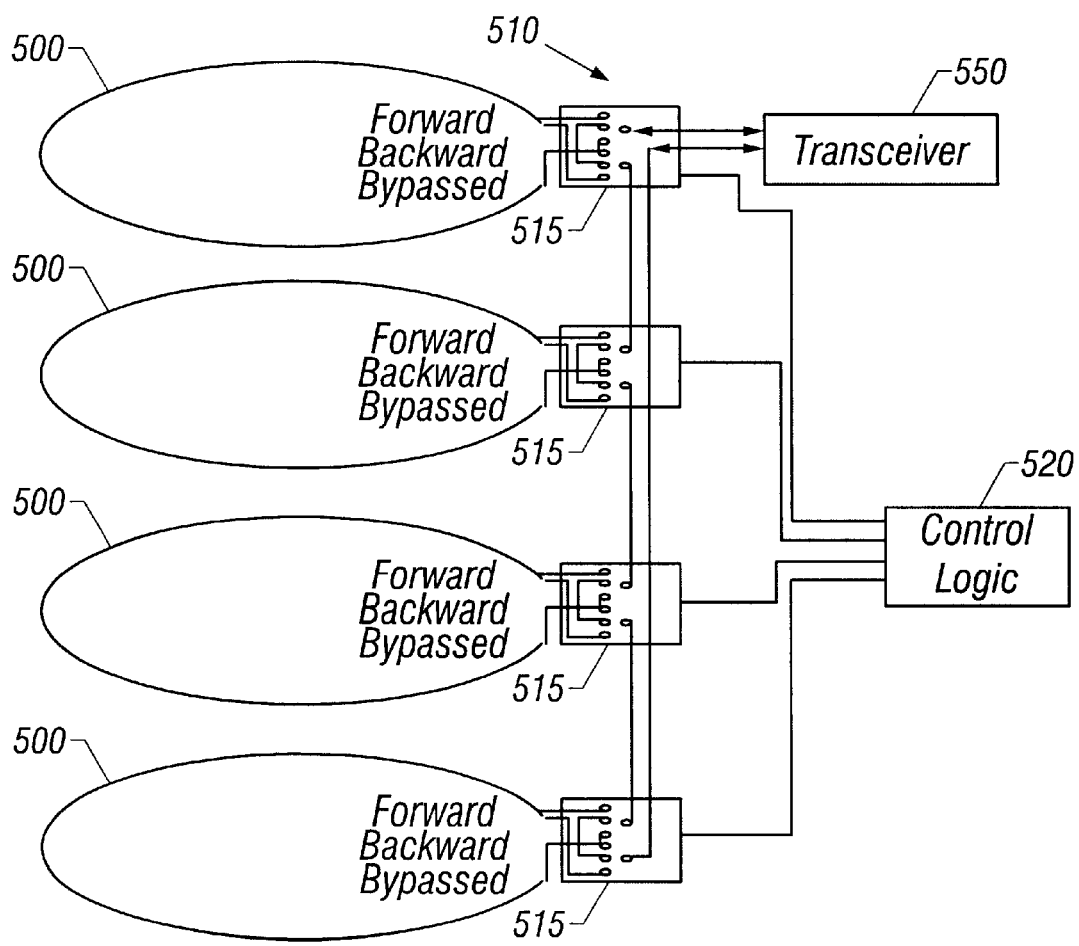
FIG. 5A and FIG. 5B illustrate in electronic block diagrams the electronics employed to steer the transmission from and reception by the transceiver of FIG. 3 in accordance with the present invention in two different implementations.
Figure 5B:
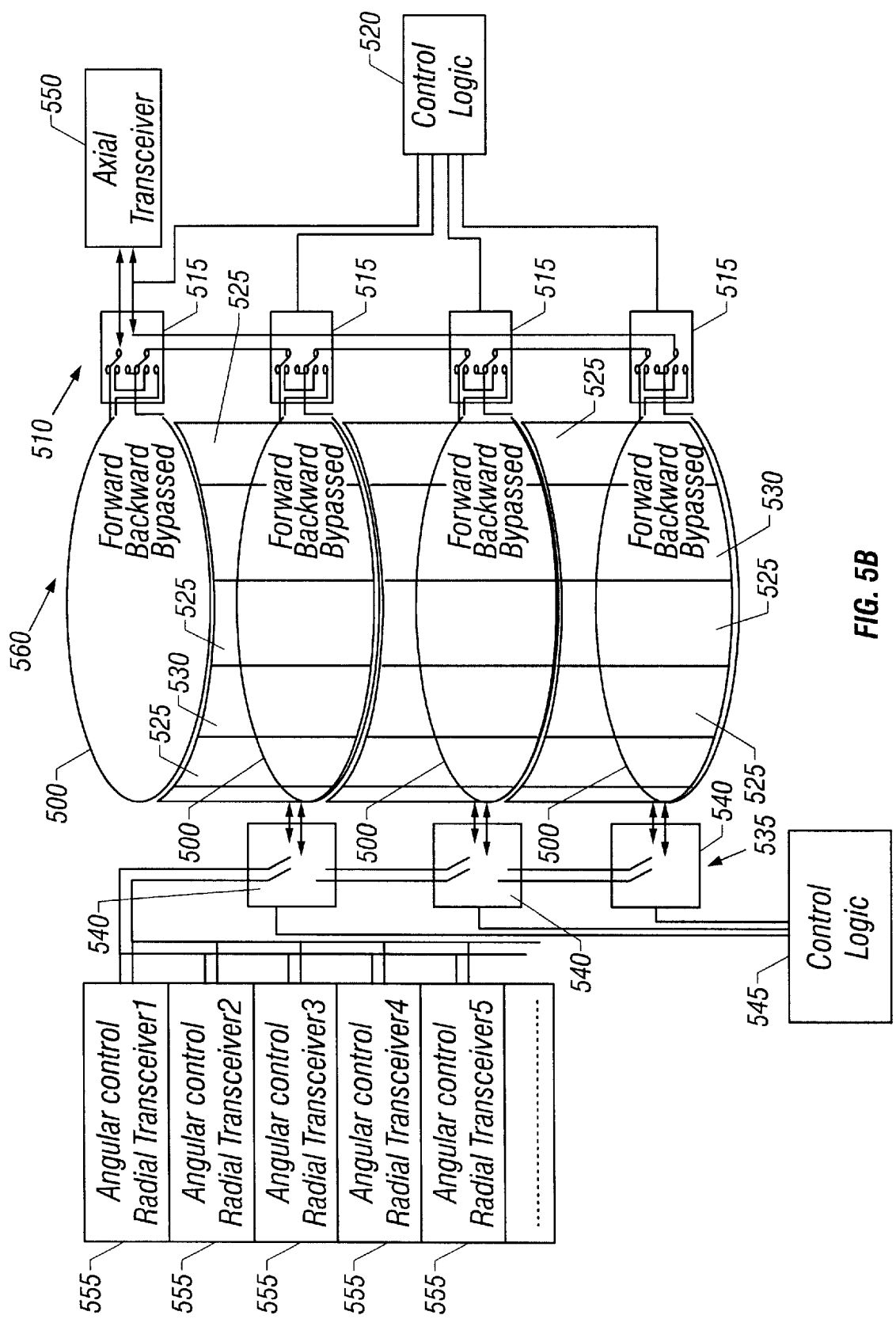

FIG. 5A and FIG. 5B illustrate how the antenna array elements 500 can be excited individually to produce a desired spatial distribution of electromagnetic fields. Furthermore, these spatial distributions can be changed in real time to keep the collar 100 and the antenna 605 of the remote sensor 115 in constant communication when there is a relative motion between the two antennas. In FIG. 5A, the antenna array 505 is axisymmetric, e.g., such as the embodiment of FIG. 4A discussed above. For this case, only axial controllability of the arrayed antenna 505 is required. That is, given the relative position of the drill collar 100 and the antenna 605 of the remote sensor 115, an appropriate subset of the array elements 500 may be energized using an array 510 of switchable elements, such as switches, 515. FIG. 5B illustrates the general case for driving the array elements 500. Here, both angular as well as axial controllability of excitation can be achieved. Note that, in FIG. 5A, the array elements 500 are configured in series. However, in both FIG. 5A and FIG. 5B, the individual array elements can be connected together in series or in parallel or a combination thereof, with some (slight) modification to the embodiment of FIG. 5A.

More particularly, and referring first to FIG. 5A, the array elements 500 produce an axisymmetric electromagnetic field, and so only axial control is needed, as was mentioned above. Note that the array elements 500 are coils wound upon a ferrite core (not shown) as in the embodiment of FIG.

4A. The switches 515 provide this control by controlling power to the individual array elements 500. The switches 515 are, in turn, controlled by electronic control logic 520. Once the control logic 520 determines the pattern in which it wishes to vary the field, it opens and closes the switches 515 to affect the variations. This determination may be made in real-time, or may be predetermined. For instance, if the primary concern is providing adequate power to all of the array elements 500, the switches 515 may be operated to provide power to them sequentially in series. If the concern is to obtain data from multiple remote sensors 115 through some, but not all, of the array elements, additional selectivity can be shown in which array elements 500 receive power.

Turning now to FIG. 5B, the embodiment shown therein includes the array elements 500, the array 510 of switches 515, and the control logic 520 of the embodiment in FIG. 5A. The embodiment of FIG. 5B exerts axial control over the electromagnetic field in the same manner as described above for the embodiment of FIG. 5A. However, the embodiment of FIG. 5B also includes several layers of array elements 525. The array elements 525 may be coils formed in a sheet 530 conformed to the internal surface of the drill collar 100, as in the embodiments of FIG. 4B and FIG. 4C discussed above. Power to the array elements 525 is controlled by a second array 535 of switches 540, whose operation is controlled by the control logic 545. Note that in some embodiments, the functionality of the control logic 545 can be combined with that of the control logic 520 to create a single control logic block. Once the control logic 545 determines the pattern in which it wishes to vary the field, it opens and closes the switches 540 to effect the variations. This determination may be made in real-time, or may be predetermined, as in the case of axial variations. Note that these particular embodiments employ a single transceiver 550 for axial control and a plurality of transceivers 555, one for each level of array elements 525, for angular control.

Thus, in the embodiment of FIG. 5B, the antenna 560 consists of an array of magnetic loop antennas 500, 525, each of which is an "array element" as was discussed above. The loops 525 provide a field mainly in a radial or angular orientation and the loops 500 provide a field mainly in an axial direction. The loops 500, 525 can be configured by the switches 515, 540 thought the control logic 520, 545. In this manner, virtually any combination of loops 500, 525 can operate in series or in parallel, be switched on or off, or operate with reversed polarity. The antenna 560 can therefore be configured to maximize a field in a particular direction and will be more sensitive to receive a field from that particular direction.

Figure 5C:
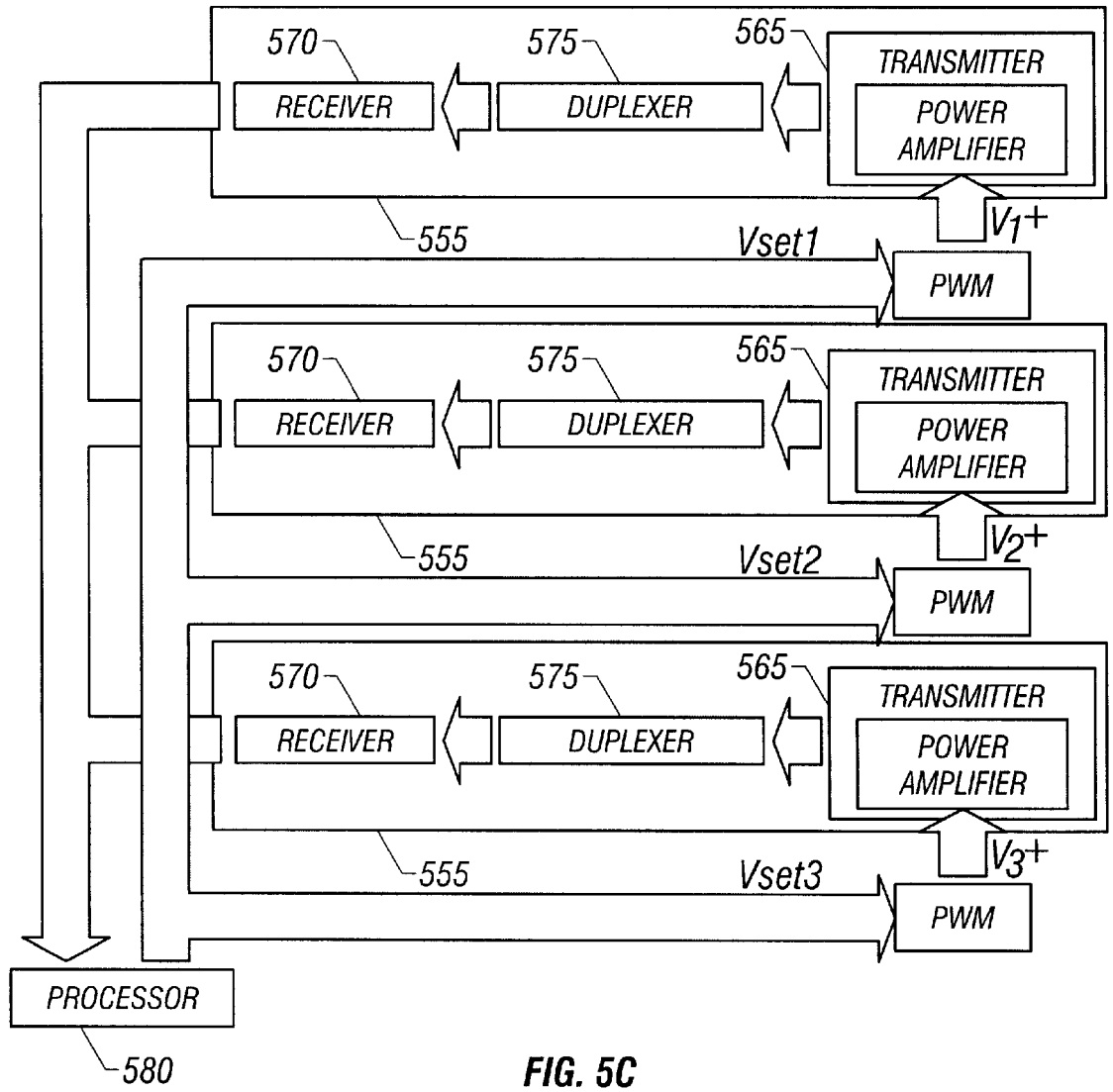
FIG. 5C illustrates in an electronic block diagram a portion of the electronic controls in the embodiment of FIG. 5B.

Note again that, for the axial loops 500, there is only the one transceiver 550, but that for the radial loops 525 there are several transceivers 555. Depending on the position of the collar antenna 560 relative to the remote sensor 115, the radial loops 525 are driven with a different signal amplitude. To measure the relative position of the collar antenna 560 to the antenna 606 (shown in FIG. 6) of the remote sensor 115, the antenna 605 of the remote sensor 115 sends short tones whenever the collar antenna 560 stops transmitting. The collar transceivers 555 detect these tones. As shown in FIG. 5C, each collar transceiver 555 consists of a transmitter 565, a receiver 570, and a duplexer 575. The transceivers 555 detect the tones through the receivers 570 via the arrayed antenna 560 (shown in FIG. 5B) and the duplexer 575, which are then forwarded to the processor 580. The processor 580 is a digital signal processor ("DSP") in the illustrated embodiment.

The processor 580 then calculates the position of the remote sensor 115 using a triangulation technique. This position information is used for a proper switch selection in an initial configuration phase and later for calculating the amplitude of the different radial loops 525. The transmitter 565 consists of a power amplifier. The power amplifier 585 is driven from a programmable oscillator (not shown). The supply voltage (also not shown) of each power amplifier 585 is also programmable. The output amplitude of each transceiver 555 is programmed via the supply voltage. For better efficiency, the supply voltage is generated with programmable switching supplies. The output amplitude of the transmitters 565 is varied via the supply voltage by pulse width modulation ("PWM") to steer the signal in the right direction by a superposition fields of different amplitudes generated by several separately driven transmitter loops.

Figure 6:
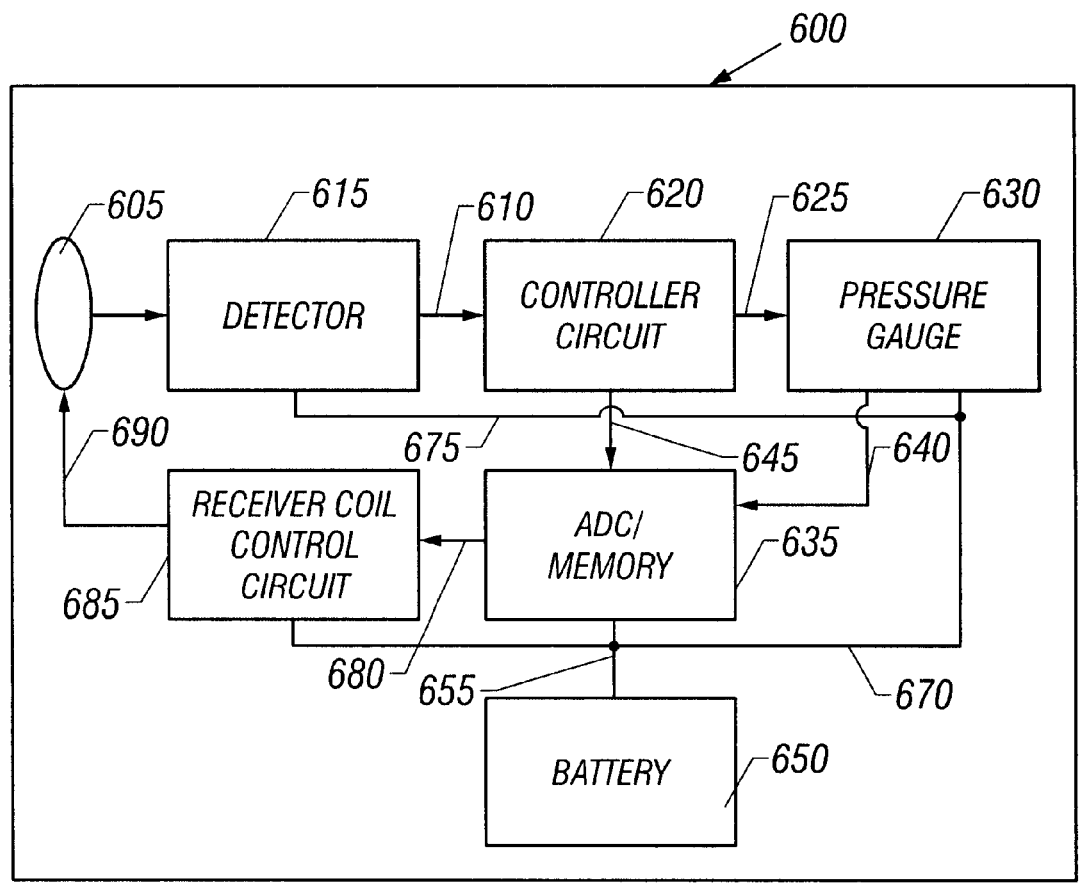
FIG. 6 is an electronic block diagram schematically illustrating the electronics of a remote sensor.

With reference to FIG. 6, the electronic circuitry of the remote "smart sensor" 115 is shown by a block diagram generally at 600 and includes at least one transmitter/receiver coil 605 or RF antenna, with the receiver thereof providing an output 610 from a detector 615 to a controller circuit 620. The controller circuit 620 is provided with one of its controlling outputs 625 being fed to a pressure gauge 630 so that gauge output signals will be conducted to an analog-to-digital converter ("ADC")/memory 635, which receives signals from the pressure gauge via a conductor 640 and also receives control signals from the controller circuit 620 via a conductor 645. A battery 650 is provided within the remote sensor circuitry 600 and is coupled with the various circuitry components of the sensor 115 by power conductors 655, 670 and 675. A memory output 680 of the ADC/memory circuit 635 is fed to a receiver coil control circuit 685. The receiver coil control circuit 685 functions as a driver circuit via conductor 690 for transmitter/receiver coil 605 to transmit data to the transmitter/receiver circuitry 300.

Throughout the complete transmission sequence, the transceiver unit 305, shown in FIG. 3, is also used as a receiver. When the amplitude of the received signal is at a maximum, the remote sensor 115 is located in close proximity for optimum transmission between the drill collar 100 and the remote sensor 115.

Figure 7:
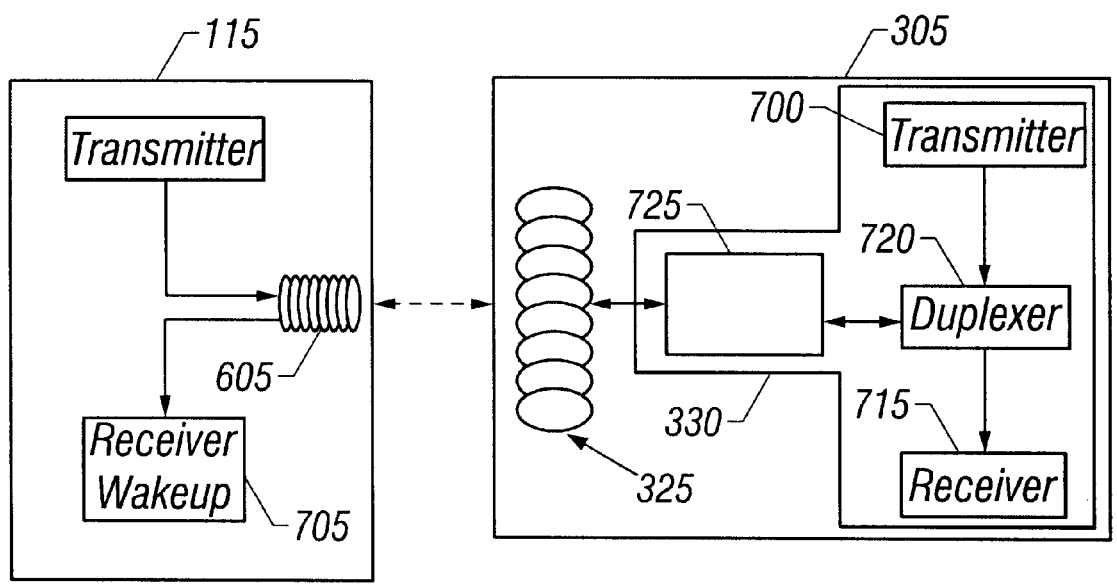
FIG. 7 is a block diagram conceptually illustrating operation of the steerable transceiver unit in conjunction with the remote sensor in accordance with the present invention.

Turning to FIG. 7, in operation, once the remote sensor 115 is emplaced, it begins collecting data. In one particular embodiment, the remote sensor 115 includes a timer that periodically initiates a power up of the electronic circuitry 600 (shown in FIG. 6). The remote sensor 115 then acquires data, stores it in the ADC/memory 635, and goes back to sleep. When the arrayed antenna 325 is aligned with the antenna 605 of the remote sensor 115, the collar transmitter 700, which contains a power amplifier (not shown), sends a wakeup tone to the remote sensor 115 through the arrayed antenna 325. The wakeup tone is transmitted at a frequency close to the resonant frequency of the remote sensor 115. The remote sensor 115 receives the tone through its antenna 605 if the arrayed antenna 325 is close enough, detects the received signal through the receiver wakeup electronics 705, and wakes up if the signal is of the right frequency. The remote sensor 115 then sends an acknowledge signal to the collar transmitter 700 and waits to receive a command.

When awakened by the collar transmitter 700, the remote sensor 115 is capable of receiving and executing a number of commands, such as acquire data, transmit data, memory read, and memory write. Most commonly, the collar transmitter 700 will instruct the remote sensor 115 to transmit data. The remote sensor 115 transmits measurement data from the transmitter 710 through the antenna 605 to the transmitter/receiver circuitry 300 and goes back to sleep.

The receiver 715 in the transmitter/receiver circuitry 300 amplifies, demodulates and decodes the data. A duplexer 720 in the collar electronics protects the receiver 715 in the collar 100. The arrayed antenna 325 in the collar 100 is tuned in resonance to the transmit frequency of the remote sensor 115. The transmitter/receiver circuitry 300 also contains, in addition to the resonance frequency tuning circuit 725, the array of switches (shown in FIG. 5A, FIG. 5B) for the selection of the active antenna array elements 400 and their polarity.

More particularly, the drill collar 100 is positioned in close proximity of the remote sensor 115. In some implementations, the drill collar 100 is actually used to emplace the remote sensor 115, in which case the drill collar 100 will be proximate the remote sensor 115. If the remote sensor 115 was previously emplaced, its location may be determined from records regarding its emplacement. As a last resort, the transceiver unit 305 can be used to locate the remote sensor 115 by bobbing the drill collar 100 in the well bore 105. An electromagnetic wave is transmitted from the transmitter/receiver circuitry 300 in the drill collar 100 to 'switch on' the remote sensor 115 and to induce the remote sensor 115 to send back an identifying coded signal. This "handshaking" process can be used to identify the location of the remote sensor 115, since the receipt of the handshaking signal from the remote sensor 115 will indicate the drill collar 100 is positioned sufficiently proximate to the location of the remote sensor 115.

The location of the remote sensor 115 must then be tracked once the location is identified. Communication between the drill collar 100 and the remote sensor 115 will typically occur during drilling operations, although this is not necessary to the practice of the invention. There typically will therefore be some degree of translational and rotational movement of the transceiver unit 305 relative to the remote sensor 115, and this movement should be tracked. This can be accomplished by identifying the array elements 400, or groups of array elements 400, receiving the handshaking signal from the remote sensor 115 over time, assuming the array elements 400 are arrayed both axially and angularly. From this information, the relative positions of the transceiver 305 elements and the remote sensor 115 can be extrapolated. Once the relative positions are extrapolated, control logic (e.g., the control logic 520, 545 in FIG. 5A and FIG. 5B) can determine how it wishes to vary the electromagnetic field generated by the transceiver unit 305 to maintain continuous contact between the drill collar 100 and the remote sensor(s) 115.

The distance from the well bore 105 that the remote sensor 115 is emplaced into the formation should also be determined. One approach to this determination is to triangulate from the phase differences of the handshaking signal as received at three or more of the array elements 400. Note that the distance determination should follow the location identification.

One advantage to identifying the location and emplacement distance of the remote sensor 115 and tracking its location is that it permits the transceiver unit to focus the electromagnetic field that it generates in the direction of the remote sensor 115. This advantage will not be appreciated in embodiments where the arrayed antenna 315 generates an axisymmetric field, however, since the field is—by definition—axisymmetric. Thus, the realization of this advantage is not necessary to the practice of the invention. This is true even in embodiments where the generated electromagnetic field is not axisymmetric. Note, however, that in embodiments where this is performed, it is performed in real time and can be implemented during drilling operations.

The handshaking process initiates the electronics of the remote sensor 115 to go into the acquisition and transmission mode, and pressure data and other data representing selected formation characteristics, as well as the sensor's identification code, are obtained at the level of the remote sensor 115. Note that, in some embodiments, the remote sensor 115 might continuously acquire data even while in a sleep state, such that it will enter a transmission mode only, on awaking. At the same time pressure gauge data (pressure and temperature) and other selected formation characteristics are acquired and the electronics of the remote sensor 115 convert the data into one or more serial digital signals. This digital signal or signals, as the case may be, is transmitted from the remote sensor 115 back to the drill collar 100 via the transmitter/receiver circuitry 300. This is achieved by synchronizing and coding each individual bit of data into a specific time sequence. Data acquisition and transmission, or at least transmission (depending on the embodiment), is terminated after stable pressure and temperature readings have been obtained and successfully transmitted to the on-board circuitry of the drill collar 100.

Whenever the sequence above is initiated, the transmitter/receiver circuitry 300 located within the drill collar 100 is powered by the transceiver power drive 310. An electromagnetic wave is transmitted from the drill collar 100 at a frequency determined by the oscillator 315. The frequency can be selected within the range from 100 KHz up to 500 MHz. As soon as the remote sensor 115 comes within the zone of influence of the transmitter/receiver circuitry 300, the receiver coil 605 located within the remote sensor 115 will radiate back an electromagnetic wave at twice the original frequency by means of the receiver coil control circuit 685 and the coil 605.

Figure 8:
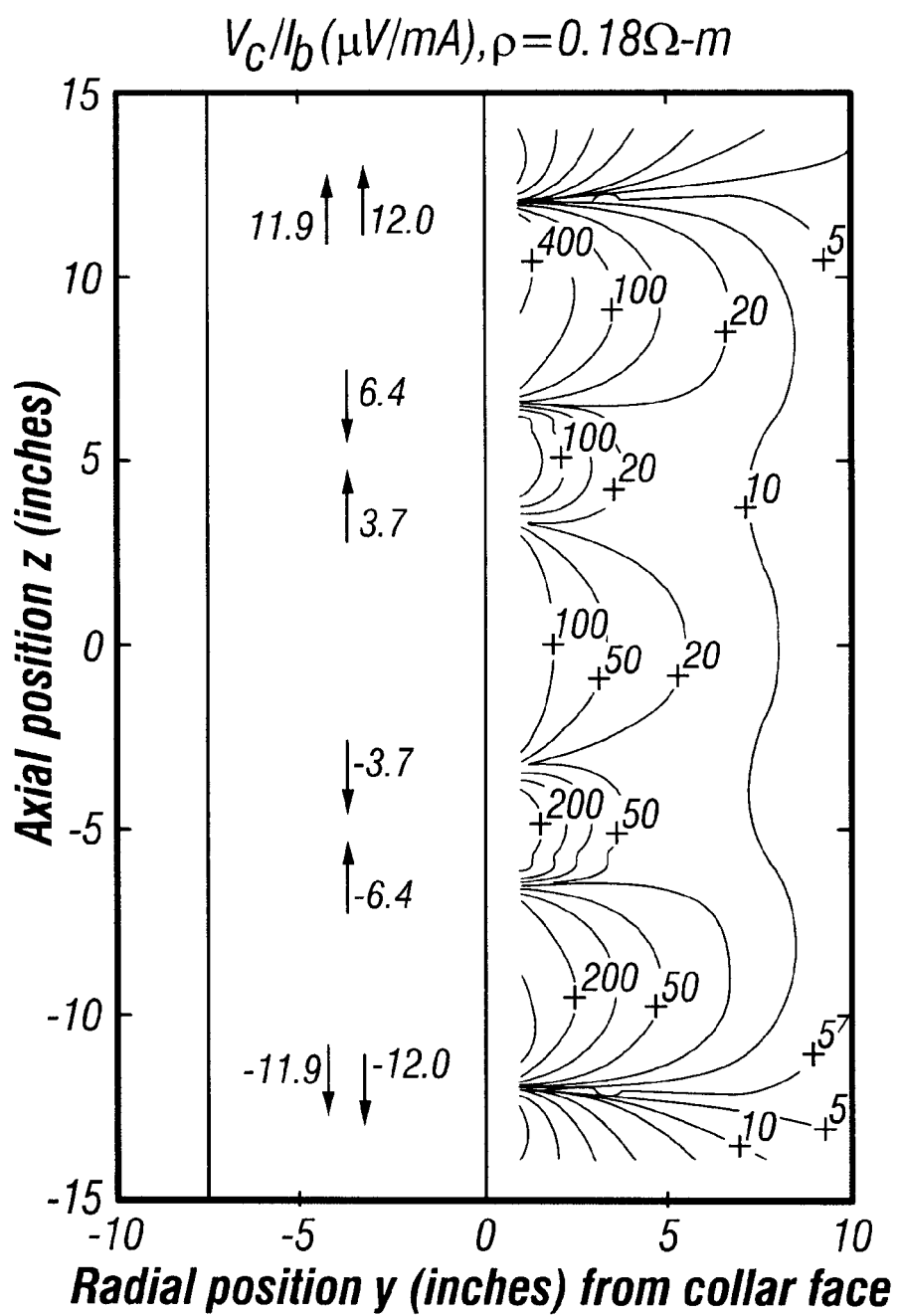
FIG. 8 graphs the measured voltage received by the remote sensor upon the introduction as a function of coil location in one particular implementation.

In one particular implementation of the embodiment in FIG. 4A, an eight-turn coil was designed. A base field was generated using a commercially available FEM code. The FEM code was validated by solving a simpler geometry using an analytical solution for coil response in a cylindrically layered medium. The field was optimized along a line extending from −10 to 10 inches in the axial direction (z) at y=7 inches. The orientation and position of each coil are shown in FIG. 8 which also gives measured voltage received by the antenna when 1 milliampere current is passed through a coil inside the formation with conductivity $\sigma_F$=5.55 S/m ($\rho$=0.18 $\Omega$-m). The plot indicates good uniformity of the voltage (and hence, the magnetic field) in the optimization region.

This concludes the detailed description of particular embodiments. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and that such variations are considered within the scope of the invention as claimed. Accordingly, the protection sought herein is as set forth in the claims below.

What is claimed:

1. An apparatus for collecting data downhole in a well bore, the apparatus comprising:
    an antenna positioned in the well bore and adapted to receive signals from a remote sensor, the antenna including a plurality of arrayed transceiver elements; and
    electronic circuitry for steering transmission or reception through the antenna by controlling the application of power to the array elements.

2. The apparatus of claim 1, wherein the array elements comprise a plurality of coils or a plurality of slots formed in a conductive sheet.

3. The apparatus of claim 2, wherein the plurality of coils are wound on a ferrite core or are arrayed upon a flexible board.

4. The apparatus of claim 2, wherein each one of the plurality of coils is a circular coil or a spiral coil.

5. The apparatus of claim 1, wherein at least a portion of the array elements is electrically connected in series.

6. The apparatus of claim 5, wherein at least a second portion of the array elements is electrically connected in parallel.

7. The apparatus of claim 1, wherein at least a portion of the array elements is electrically connected in parallel.

8. The apparatus of claim 1, wherein the electronic circuitry includes a plurality of switchable elements capable of controlling excitation power to each individual array element.

9. The apparatus of claim 8, wherein the switchable elements may be operated to produce a real-time, time-varying spatial profile of a magnetic field transmitted through the antenna.

10. The apparatus of claim 1, wherein the electronic circuitry steers the transmission or reception to produce a real-time, time-varying spatial profile of a magnetic field transmitted through the antenna.

11. The apparatus of claim 1, wherein the electronic circuitry steers the transmission or reception axially.

12. The apparatus of claim 1, wherein the electronic circuitry furthermore steers the transmission or reception angularly.

13. An apparatus for collecting data downhole in a well bore, the apparatus comprising:
  an antenna positioned in the well bore and adapted to receive signals from a remote sensor, the antenna including a plurality of arrayed transceiver elements; and
  means for steering transmission or reception through the antenna by controlling the application of power to the array elements.

14. The apparatus of claim 13, wherein the array elements comprise a plurality of coils or a plurality of slots formed in a conductive sheet.

15. The apparatus of claim 14, wherein the plurality of coils are wound on a ferrite core or are arrayed upon a flexible board.

16. The apparatus of claim 14, wherein each one of the plurality of coils is a circular coil or a spiral coil.

17. The apparatus of claim 13, wherein at least a portion of the array elements is electrically connected in series.

18. The apparatus of claim 17, wherein at least a second portion of the array elements is electrically connected in parallel.

19. The apparatus of claim 13, wherein at least a portion of the array elements is electrically connected in parallel.

20. The apparatus of claim 13, wherein the steering means includes a plurality of switchable elements capable of controlling excitation power to each individual array element.

21. The apparatus of claim 20, wherein the switchable elements may be operated to produce a real-time, time-varying spatial profile of a magnetic field transmitted through the antenna.

22. The apparatus of claim 13, wherein the steering means steers the transmission or reception to produce a real-time, time-varying spatial profile of a magnetic field transmitted through the antenna.

23. The apparatus of claim 13, wherein the steering means steers the transmission or reception axially.

24. The apparatus of claim 13, wherein the steering means furthermore steers the transmission or reception angularly.

25. An apparatus for collecting data downhole in a well bore, the apparatus comprising:
  an antenna positioned in the well bore and adapted to receive signals from a remote sensor, the antenna including a plurality of arrayed transceiver elements; and
  a plurality of switchable elements capable of controlling excitation power to each individual array element to steer transmission or reception through the antenna by controlling the application of power to the array elements.

26. The apparatus of claim 25, wherein the array elements comprise a plurality of coils or a plurality of slots formed in a conductive sheet.

27. The apparatus of claim 26, wherein the plurality of coils are wound on a ferrite core or are arrayed upon a flexible board.

28. The apparatus of claim 26, wherein each one of the plurality of coils is a circular coil or a spiral coil.

29. The apparatus of claim 25, wherein at least a portion of the array elements is electrically connected in series.

30. The apparatus of claim 29, wherein at least a second portion of the array elements is electrically connected in parallel.

31. The apparatus of claim 25, wherein at least a portion of the array elements is electrically connected in parallel.

32. The apparatus of claim 25, wherein the electronic circuitry steers the transmission or reception to produce a real-time, time-varying spatial profile of a magnetic field transmitted through the antenna.

33. The apparatus of claim 25, further comprising a second array of switchable elements capable of controlling excitation power to each individual array element to steer transmission or reception through the antenna in an angular direction by controlling the application of power to the array elements.

34. A drill collar, for collecting data downhole in a well bore, the drill collar comprising:
  at least one transceiver positioned in the well bore and adapted to receive signals from a remote sensor for collecting data downhole in a well bore, including:
    an antenna including a plurality of arrayed transceiver elements; and
    electronic circuitry for steering transmission from or reception by the transceiver through the antenna by controlling the application of power to the array elements;
  transceiver power drive for powering the transceiver;
  an oscillator determining the frequency of the transceiver power drive; and
  tuned receiver amplifier for use by the transceiver in the steered reception.

35. The drill collar of claim 34, wherein at least a portion of the array elements is electrically connected in series.

36. The drill collar of claim 35, wherein at least a second portion of the array elements is electrically connected in parallel.

37. The drill collar of claim 34, wherein at least a portion of the array elements is electrically connected in parallel.

38. The drill collar of claim 34, wherein the electronic circuitry steers the transmission or reception to produce a real-time, time-varying spatial profile of a magnetic field transmitted through the antenna.

39. The drill collar of claim 34, wherein the electronic circuitry steers the transmission or reception axially.

40. The drill collar of claim 34, wherein the electronic circuitry furthermore steers the transmission or reception angularly.

41. The drill collar of claim 34, further comprising means for laterally deploying a remote sensor to a location within a subsurface formation beyond the well bore.

42. The drill collar of claim 41, wherein the laterally deploying means of the remote intelligent sensor comprises a hydraulic actuator system including a hydraulically energized deployment ram disposed for engagement with the remote sensor.

43. A method for collecting data downhole in a well bore, the method comprising:

positioning a transceiver unit in the well bore proximate a remote sensor placed into a formation, the transceiver unit comprising an antenna including a plurality of arrayed transceiver elements; and steering an electromagnetic signal through the antenna to communicate with the remote sensor over a wireless link.

44. The method of claim 43, wherein positioning the transceiver unit includes positioning a transceiver unit during a drilling operation.

45. The method of claim 43, wherein positioning the transceiver unit includes locating the remote sensor.

46. The method of claim 43, further comprising placing the remote sensor into the formation.

47. The method of claim 43, wherein positioning the transceiver unit proximate the remote sensor includes positioning the transceiver unit proximate a sleeping remote sensor.

48. The method of claim 43, wherein steering the electromagnetic signal includes steering a transmission or reception to produce a real-time, time-varying spatial profile of a magnetic field.

49. The method of claim 48, wherein steering the transmission or reception to produce a real-time, time-varying spatial profile of a magnetic field includes steering the transmission or reception in an axial direction.

50. The method of claim 48, wherein steering the transmission or reception to produce a real-time, time-varying spatial profile of a magnetic field includes steering the transmission or reception in an angular direction.

51. The method of claim 48, wherein steering the transmission or reception to produce a real-time, time-varying spatial profile of a magnetic field includes steering the transmission or reception in an angular direction.

52. An apparatus for collecting data downhole in a well bore, the apparatus comprising:

means for positioning a transceiver unit in the well bore proximate a remote sensor placed into a formation; and means for steering an electromagnetic signal to communicate with the remote sensor over a wireless link.

53. The apparatus of claim 52, wherein the means for positioning the transceiver unit includes means for positioning a transceiver unit during a drilling operation.

54. The apparatus of claim 52, wherein the means for positioning the transceiver unit includes means for locating the remote sensor.

55. The apparatus of claim 52, further comprising means for placing the remote sensor into the formation.

56. The apparatus of claim 52, wherein the means for positioning the transceiver unit proximate the remote sensor includes means for positioning the transceiver unit proximate a sleeping remote sensor.

57. The apparatus of claim 52, wherein the steering means includes an antenna including a plurality of arrayed transceiver elements; and electronic circuitry for steering transmission or reception through the antenna by controlling the application of power to the array elements.

58. The apparatus of claim 52, wherein the means for steering the electromagnetic signal includes means for steering a transmission or reception to produce a real-time, time-varying spatial profile of a magnetic field.

59. The apparatus of claim 58, wherein the means for steering the transmission or reception to produce a real-time, time-varying spatial profile of a magnetic field includes means for steering the transmission or reception in an axial direction.

60. The apparatus of claim 58, wherein the means for steering the transmission or reception to produce a real-time, time-varying spatial profile of a magnetic field includes means for steering the transmission or reception in an angular direction.

61. The apparatus of claim 58, wherein the means for steering the transmission or reception to produce a real-time, time-varying spatial profile of a magnetic field includes means for steering the transmission or reception in an angular direction.

62. The apparatus of claim 58, wherein the means for steering a transmission or reception to produce a real-time, time-varying spatial profile of a magnetic field includes:

an antenna including a plurality of arrayed transceiver elements; and electronic circuitry for steering transmission or reception through the antenna by controlling the application of power to the array elements, including:

an array of switchable elements capable of controlling excitation power to each individual array element.

* * * * *